United States Patent [19]

Dommer et al.

[11] 4,270,413

[45] Jun. 2, 1981

[54] INTERMITTENT OPERATION ARRANGEMENT IN A NOTCHING MACHINE

[75] Inventors: Hans-Martin Dommer, Göppingen; Otto Kurz, Hattenhofen, both of Fed. Rep. of Germany

[73] Assignee: L. Schuler GmbH, Göppingen, Fed. Rep. of Germany

[21] Appl. No.: 8,847

[22] Filed: Feb. 2, 1979

[30] Foreign Application Priority Data

Feb. 2, 1978 [DE] Fed. Rep. of Germany ....... 2804390

[51] Int. Cl.[3] ............................................ F16H 21/26

[52] U.S. Cl. ........................................ 74/828; 74/38; 74/520

[58] Field of Search .................. 74/828, 829, 830, 40, 74/105, 520, 38; 83/527, 528, 615

[56] References Cited

U.S. PATENT DOCUMENTS

| | | | |
|---|---|---|---|
| 1,274,196 | 7/1918 | Reed | 83/528 |
| 1,661,874 | 3/1928 | Byerlein | 74/829 |
| 2,587,746 | 3/1952 | May | 74/520 |
| 3,174,347 | 3/1965 | Hecht | 74/40 X |
| 3,892,138 | 7/1975 | Vomberg | 74/520 |
| 4,208,924 | 6/1980 | Brunner | 74/38 |

FOREIGN PATENT DOCUMENTS

| | | | |
|---|---|---|---|
| 55255 | 1/1911 | Fed. Rep. of Germany | 74/40 |
| 522834 | 3/1931 | Fed. Rep. of Germany | 74/44 |
| 864184 | 1/1953 | Fed. Rep. of Germany | 74/101 |
| 2043999 | 3/1972 | Fed. Rep. of Germany | 83/528 |
| 2428077 | 1/1976 | Fed. Rep. of Germany | 83/615 |

*Primary Examiner*—Lawrence J. Staab
*Attorney, Agent, or Firm*—Craig and Antonelli

[57] ABSTRACT

An arrangement for an intermittent operation in a notching machine which includes a ram driven by way of a crank or eccentric drive which ram is articulated to a toggle joint. The notching machine has an operating cycle which consists of alternatingly successive notching and notch-free steps which is attainable by means of a cylinder-piston unit activatable pneumatically or hydraulically which unit is in operative connection with an eccentric supported on a pin with the eccentric being the central fulcrum of the toggle joint. A second toggle joint with a counterbalancing mass is diametrically opposed to the ram with the second toggle joint being articulated to the eccentric. The central pivot as well as the points of articulation of the toggle joints to the ram and counterbalancing mass are disposed substantially in one plane.

7 Claims, 2 Drawing Figures

INTERMITTENT OPERATION ARRANGEMENT IN A NOTCHING MACHINE

Figure 1:
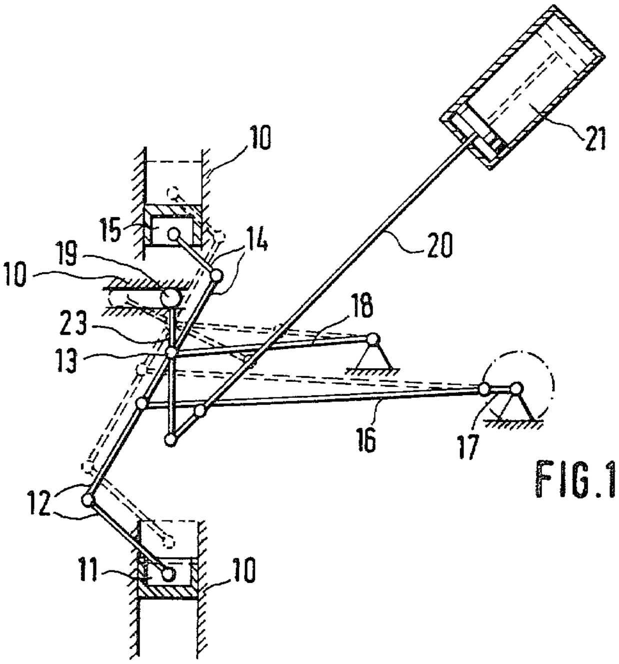

The present invention relates to a notching machine and, more particularly, to an arrangement for enabling an intermittent operation of a notching machine, which machine includes a ram driven by way of a crank or eccentric drive, with the ram being articulated to a toggle joint and with the toggle joint being driven by said crank or eccentric drive. The operating cycle of the notching machine consists of alternating successive notching and notch-free steps through the use of a cylinder piston unit which is activatable pneumatically or hydraulically and which is in an operative connection with an eccentric supported on a pin whereby the eccentric a serves as central fulcrum of the toggle joint.

Offenlegungsschrift No. 2 043 999 proposes an apparatus for controlling a ram operating cycle for intermittent operation in a notching machine, which includes the use of a toggle lever drive mechanism operated by a crank or eccentric drive mechanism at more than 1,000 ram strokes per minute. The high number of strokes is obtained in the notching machine by optimizing the electromechanical, pneumatic, and constructional elements of such machine. Additionally, a numeric control system providing for a freely programmable control is employed so as to insure an almost troublefree and rapid operation of the notching machine.

A further development of notching machines is proposed in Offenlegungsschrift No. 24 28 077, wherein a device for mass balancing of a ram in a notching machine which is operated by a crank or eccentric drive mechanism is disclosed. The device including a toggle lever drive to which the ram is articulated with a diametrically opposed additional toggle lever being associated with the toggle lever drive. A counterbalancing mass, articulated to a lever of the additional toggle lever, is guided in a straight guideway in the same plane as the ram axis in order to compensate for the oscillating masses which are composed essentially of the ram, an upper part of a tool, and a portion of a drive connecting rod mass. One disadvantage of this proposed device resides in the fact that an intermittent operation of the notching machine is not provided.

The aim underlying the present invention essentially resides in providing an arrangement for a notching machine which permits intermittent operation, with the arrangement having the advantages of a high stroke rate such as attained in Offenlegungsschrift No. 2 043 999 while at the same time having an effective counterbalancing action.

In accordance with advantageous features of the present invention, a conventional second toggle joint with a counterbalancing mass in diametrical opposition to a ram is articulated to an eccentric which constitutes a central pivot or fulcrum. In this arrangement the central pivot of the toggle joints and the points of articulation of the toggle joints to the ram and to the counterbalancing mass are disposed substantially in one plane.

In accordance with another advantageous feature of the present invention, the central pivot or fulcrum is adjustably guided in the machine frame in a rocker arm and in sliding members such as sliding blocks.

Moreover, according to the present invention, the central pivot or fulcrum may be adjustably guided in the machine frame in a vertical guideway as well as in sliding members such as sliding blocks.

In accordance with further features of the present invention, the counterbalancing mass may be guided in a rocker arm supported at the machine frame with the rocker arm being adjustable at an eccentric bearing together with the central pivot or fulcrum.

Furthermore, according to the present invention, the cylinder-piston unit may include a double acting piston and a continuous piston rod, one end of which is articulated to the eccentric of the central pivot or fulcrum, with the other end being articulated to the eccentric bearing.

One advantage of the arrangement in accordance with the present invention resides in the fact that the notching machine operates, even during intermittent operation, with an extremely quiet running characteristic which is attained by the counterbalancing action.

While an incorporation of the apparatus of Offenlegungsschrift No. 2 043 999 into a notching machine with a counterbalancing means, such as proposed in Offenlegungsschrift No. 24 28 077, would permit an intermittent operation, a quiet running of the notching machine would be lost, for example, during the intervals where no notching takes place since the masses of the ram, upper part of the tool, and portion of the drive connecting rod mass and the counterbalancing masses would no longer oscillate exactly against each other.

Accordingly, it is an object of the present invention to provide an arrangement for enabling an intermittent operation of a notching machine which avoids, by simple means, shortcomings and disadvantages encountered in the prior art.

Another object of the present invention resides in providing an arrangement for enabling an intermittent operation of a notching machine which insures an optimally quiet operation of the machine.

A further object of the present invention resides in providing an arrangement for enabling an intermittent operation of a notching machine which insures an oscillation of oscillating masses of the notching machine exactly against the counterbalancing masses.

Figure 2:
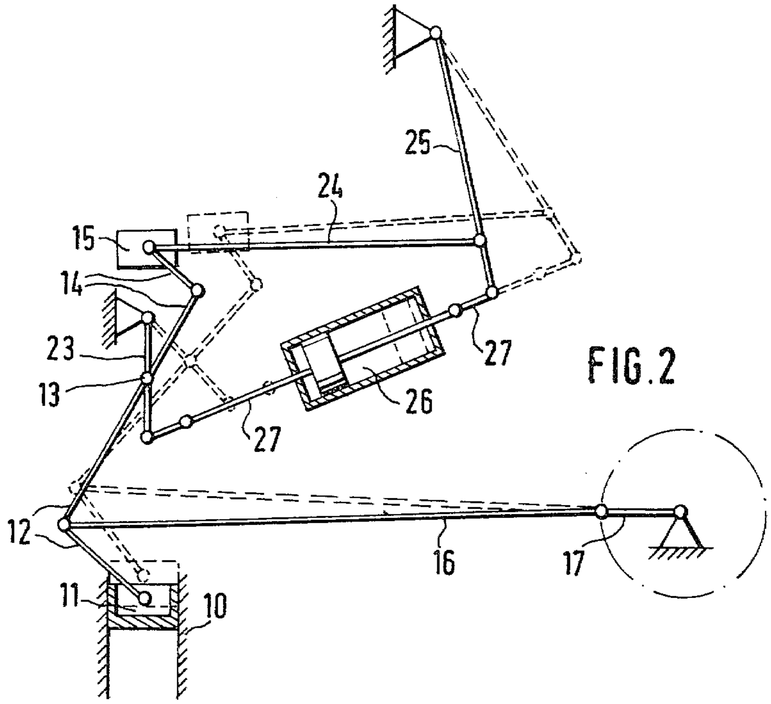

These and other objects, features, and advantages of the present invention will become more apparent from the following description when taken in connection with the accompanying drawing, which shows, for the purposes of illustration only, two embodiments in accordance with the present invention, and wherein:

FIG. 1 is a schematic view of a first embodiment in accordance with the present invention wherein a counterbalancing mass is fixedly guided at a machine frame; and FIG. 2 is a schematic view of a second embodiment of the present invention, wherein a counterbalancing mass is guided at a rocker arm.

Referring now to the drawings wherein like reference numerals are used in both views to designate like parts and, more particularly, to FIG. 1, according to this figure, a ram 11 is guided in a frame 10 of a notching machine, with the ram 11 being articulated to a toggle joint 12. The toggle joint 12 in turn is articulated to a central pivot or fulcrum 13 to which is articulated a further toggle joint 14 and connected to a counterbalancing mass 15. The two toggle joints 12, 14 are nonrotatably connected to each other. The counterbalancing mass 15 is arranged diametrically opposite to the ram 11 and is dimensioned so as to compensate for the effects of the mass of the ram 11, as well as the associated mass portions of the toggle joint 12.

A connecting rod 16 is articulated to a first leg of the toggle joint 12 associated with the central pivot or fulcrum 13. The central pivot or fulcrum 13 is supported in a rocker arm 18 and is displaceable in the frame 10 by means of sliding members such as sliding blocks 19. A piston rod 20 of a cylinder-piston unit 21 is attached to an eccentric 23, with the cylinder-piston unti 21 serving to adjust the eccentric 23. The adjustable eccentric 23, in the illustrated embodiment, being constructed as adjustable crank. The cylinder-piston unit 21 is fixedly connected to frame 10 of the notching machine.

During a normal operation, that is during a notching step, the rocker arm 18, the toggle joints 12, 14, the ram 11, and the counterbalancing mass 15 assume the positions shown in solid lines in FIG. 1. During a notch-free interval a pressure medium is supplied from a suitable pressure medium source (not shown) to the cylinder-piston unit 21 which results in a displacement of the piston rod 20 so that, inter alia, the eccentric 23 and the rocker arm 18 are brought into the position shown in dashed lines in FIG. 1. In this last mentioned position, the sliding blocks 19 are deflected so that the central pivot or fulcrum 13 is lifted by an amount necessary for a notch-free step, but the pivot 13 remains on a mean perpendicular line extending between the ram 11 and the counterbalancing mass 15. The lifting action of the central pivot or fulcrum 13 is provided by way of the eccentric 23 rotatably held in the rocker arm 18.

By virtue of the above-noted features, during notching operations as well as during notch-free intervals, the points of articulation of the ram 11 and the counterbalancing mass 15 oscillate in the same plane with the toggle joints 12, 14 so as to insure an optimally quiet operation of the notching machine.

As shown in FIG. 2, the ram 11 is guided in the frame 10 of the notching machine, with the ram 11 being articulated to a central pivot or fulcrum 13 by way of a toggle joint 12. The second toggle joint 14, which is nonrotatably connected to toggle joint 12 having the counterbalancing mass 15, is supported at the central pivot or fulcrum 13. In contrast to the arrangement of FIG. 1, the counterbalancing mass 15 in FIG. 2 is not fixedly guided with respect to the frame 10, but rather is supported at a rocker arm 24 resting on an eccentric bearing 25. The central pivot 13 is located on an adjustable eccentric 23. The eccentric bearing 25 and the eccentric 23, in the illustrated embodiment, being constructed as adjustable cranks.

The notching machine is driven by means of a crank or eccentric drive mechanism 17 through a connecting rod 16 connected to the toggle joint 12. The eccentric bearing 25 and the eccentric 23 are adjusted by a double acting cylinder-piston unit 26 which is fixedly connected to the frame 10 and which is provided with a continuous piston rod 27. By means of the adjustment by the double acting cylinder-piston unit 26, the ram 11 passes from a position required during a notching operation into a higher position required for a notch-free interval, wherein the rocker arm 24 is pivoted by way of the adjustable eccentric bearing 25 and the eccentric 23, with the central pivot 13 also being pivoted in such a way that the components assume the position illustrated in dashed lines in FIG. 2.

By virtue of the last mentioned positioning, the central pivot or fulcrum 13, as well as the points of articulation of the ram 11 and of the counterbalancing mass 15 with the toggle joints 12, 14, oscillate in approximately the same plane and, as in the arrangment of FIG. 1, a mass-balanced intermittent operation is attained.

While we have shown and described only two embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. An arrangement for enabling an intermittent operation of a notching machine so as to provide for an operating cycle consisting of alternatingly successive notching and notch-free operational steps, the notching machine comprising a first toggle joint means having a first end articulated to a ram and having a second end connected to a central pivot means, a second toggle joint means having a first end articulated to a counterbalance mass means and having a second end nonrotatably secured to the second end of said first toggle joint means at said central pivot means, eccentric drive means operatively connected to one of said first and second toggle joint means for driving said ram, a crank means having one end mounted on a frame of the notching machine and another end operatively connected to a cylinder-piston means, said crank means having an intermediate portion thereof pivotally connected to said toggle joint means at said central pivot means such that selective positioning of said crank means by the cylinder-piston means causes adjustment of the stroke of said ram; the crank means, cylinder-piston means and toggle joint means being arranged such that the central pivot means lies along a straight line connecting the first ends of said toggle joint means for all possible positions of said crank means.

2. An arrangement according to claim 1, characterized in that a freely programmable control means is provided for controlling an operation of the notching machine.

3. An arrangement according to claim 1, characterized in that means are provided for adjustable guiding the movement of the central pivot means as said cylinder piston means selectively positions said crank means.

4. An arrangement according to claim 3, characterized in that said adjustable guiding means includes a rocker arm pivotally connected to said crank means and a sliding block means adapted to be displaceably guided in a frame of the notching machine.

5. An arrangement according to claim 3, characterized in that the guide means includes a guideway provided in a frame of the machine and a sliding block means fixed to said one end of said crank means and adapted to be displaceably guided in said guideway.

6. An arrangement according to claim 1, characterized in that a rocker arm means is provided for guiding the movement of the counterbalancing mass means, said rocker arm means being pivotally supported at the frame of the notching machine and being adjustable with the central pivot means as said cylinder piston means selectively positions said crank means.

7. An arrangement according to claim 6, characterized in that the cylinder-piston means includes a continuous piston rod having a first end articulated to the crank means and a second end thereof operatively connected to the rocker arm means.

* * * * *